United States Patent [19]

Nakajima et al.

[11] Patent Number: 4,653,070

[45] Date of Patent: Mar. 24, 1987

[54] CHANNEL MONITORING CIRCUIT FOR USE IN A REPEATER STATION OVER RADIO DIGITAL TRANSMISSION

[75] Inventors: Masahiro Nakajima; Hiromi Hashimoto, both of Tokyo, Japan

[73] Assignee: NEC Corporation, Tokyo, Japan

[21] Appl. No.: 773,161

[22] Filed: Sep. 6, 1985

[51] Int. Cl.$^4$ ............................................. H04L 1/24
[52] U.S. Cl. ........................................ 375/3; 375/10; 455/9; 371/22; 371/49
[58] Field of Search ...................... 375/3, 4, 10; 455/7, 455/8, 9, 10, 17; 371/22, 48, 49; 364/514; 340/825.06, 825.16; 370/13, 17, 55

[56] References Cited

U.S. PATENT DOCUMENTS 3,987,395 10/1976 Desombre et al. ...................... 455/8
4,441,185 4/1984 Jungmeister ............................ 375/4
4,498,082 2/1985 Aldridge et al. ................ 340/825.16

Primary Examiner—Benedict V. Safourek
Attorney, Agent, or Firm—Sughrue, Mion, Zinn, Macpeak, and Seas

[57] ABSTRACT

In radio digital transmission system including at least one repeater station, a channel monitoring circuit of each repeater station comprises, besides the conventional inter-terminals fault detection circuit using parity check system, a control bit inserting circuit for inserting a parity control bit into the received signal, a control bit extracting circuit for extracting the control bit from the received signal, a logic circuit for logically operating the output signal of the conventional fault detection circuit and the output signal of the control bit extracting circuit, and a second fault detecting circuit responsive to the output signal of the logic circuit for detecting the fault on the transmitting line between the repeater station and an immediately preceding station.

4 Claims, 4 Drawing Figures

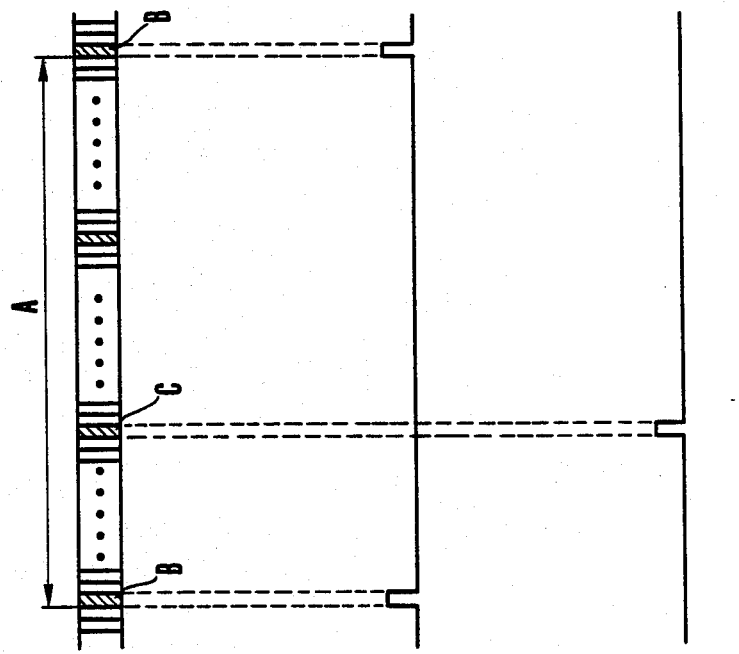

CHANNEL MONITORING CIRCUIT FOR USE IN A REPEATER STATION OVER RADIO DIGITAL TRANSMISSION

BACKGROUND OF THE INVENTION

This invention relates to a channel monitoring circuit, particularly to a channel monitoring circuit in a radio digital transmission system including repeater stations.

A parity check method is widely used for monitoring the channel quality of a radio digital transmission system. As is well known in the art, according to the parity check method, a digital signal made up of a pulse series including marks and spaces to be transmitted is divided into a plurality of data sections of a suitable number of time slots at the transmitting terminal station. The numbers of the marks or spaces of respective sections are counted and the results are inserted in predetermined time slots of each data section as parity check data. In the receiving terminal station, the number of received marks or spaces of a data section is counted for calculating the parity and the parity check data in the data section is extracted. Then, calculated parity data and the extracted parity check data are compared for confirming whether there is a bit error in the data section. All of the data sections are checked in same manner as described above. With this method of detecting the bit error by inserting the parity check data into the transmitted data at the transmitting station and then checking the parity check data at the receiving station, although a fault on the transmission line between the transmitting and receiving stations can be detected, where more than one repeater stations are interposed between the transmitting and receiving stations, a position of the fault on the transmission line can not be determined.

SUMMARY OF THE INVENTION

Accordingly, it is an object of this invention to provide a novel channel monitoring circuit capable of monitoring the quality of the channel not only between the transmitting and receiving terminal stations, but also between any two stations in the radio digital transmission system including the repeater stations.

According to this invention, there is provided a channel mornitoring circuit provided for the repeater station of a radio digital transmission system comprising; an input terminal supplied with a digital input signal from a receiving unit of the repeater station, a counter connected to the input terminal for counting a number of mark signals contained in a data section having a predetermined number of time slots of the input signal, a check bit extracting circuit connected to the input terminal for extracting a parity check bit from the input signal, and a comparator for comparing output signals of the counter and the check bit extraction circuit, first fault detecting circuit responsive to the output signal of the comparator for detecting a fault on the transmission line between a transmitting station and the repeater station, a control bit inserting circuit for inserting the output of the comparator into the input signal as a parity control bit, an output terminal connected to the control bit inserting circuit for sending the input signal inserted with the parity control bit to a transmitting unit of the repeater station, a control bit extracting circuit for extracting the control bit from the input signal, a logic circuit supplied with the output signal of the control bit extracting circuit and an output signal of the comparator for logically operating these output signals to produce a signal representing occurrence of a fault, and a second fault detecting circuit responsive to the output signal of the logic circuit for detecting a fault on the transmitting line between the repeater station and an immediately preceding station.

BRIEF DESCRIPTION OF THE DRAWINGS

In the accompanying drawings:

FIGS. 2A, 2B and 2C are timing charts showing time relationships among various signals in the circuit shown in FIG. 1.

DESCRIPTION OF THE PREFERRED EMBODIMENT

Figure 1:
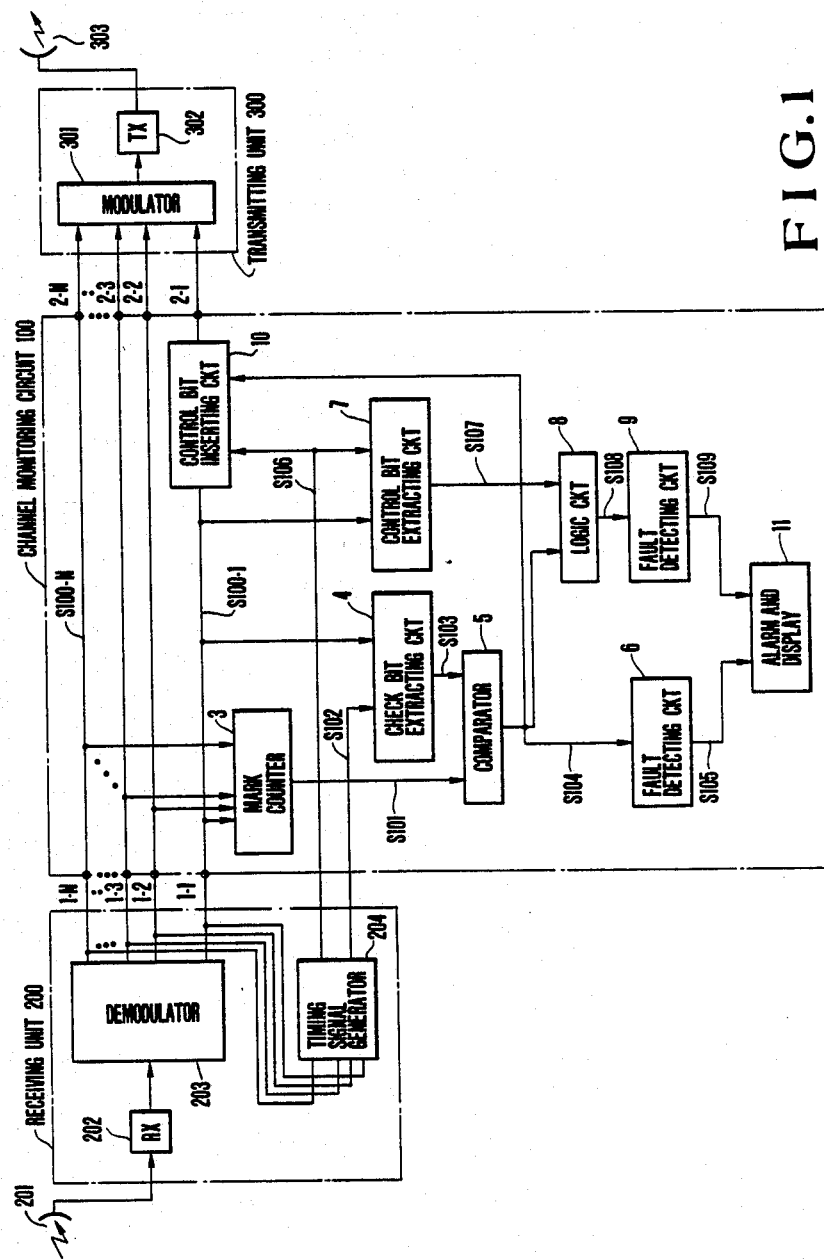
FIG. 1 is a block diagram showing the circuit construction of an embodiment according to this invention.

The preferred embodiment of the present invention will be described in detail with reference to the accompanying drawings.

FIG. 1 is a block diagram showing one example of a channel monitoring circuit incorporated into a repeater station in a radio digital transmission system.

In FIG. 1, a radio digital signal transmitted from a station which immediately precedes the repeater station (hereinafter referred to an immediately preceding station) is received by a receiver 202 via a receiving antenna 201. The output of the receiver 202 is supplied to a demodulator 203 whereby an IF signal is demodulated into N row data signals which are applied to input terminals 1-1, 1-2, ... 1-N of a channel monitoring circuit 100. In a timing signal generator of the receiving unit 200 a reference signal is extracted from a synchronizing signal included in the demodulated signal, to suply timing signals S102 and S106 to be described later to the channel monitoring circuit 100. The data input terminals 1-1 - 1-N are connected to the input terminals of a mark counter 3. Also, the data input terminal 1-1 is connected to the input terminals of a check bit extracting circuit 4, a control bit extracting circuit 7 and a control bit inserting circuit 10. The output terminals of the mark counter 3 and the check bit extracting circuit 4 are respectively connected to two input terminals of a comparator 5, the output terminal thereof being connected to the input terminals of a fault detecting circuit 6, a logic circuit 8, and a control bit inserting circuit 10. The output terminal of the logic circuit 8 is connected to the input terminal of another fault detecting circuit 9. The output terminals of the fault detecting circuits 6 and 9 are connected to input terminals of an alarm and a display circuit 11. The output terminal of the control bit inserting circuit 10 is connected to one output terminal 2-1 among N output terminals 2-1, 2-2, ... 2-N. Other output terminals 2-2, ... 2-N are connected to input terminals 1-2, - 1-N, respectively.

The output terminals 2-1 ... 2-N are connected to the input terminals of the modulator 301 of the transmitting unit 300. The modulator 301 modulates N row input signals into an IF signal which is supplied to a transmitter 302 which sends a radio digital signal to the next station through an antenna 303.

A timing signal S102 generated by the timing signal generator 204 is supplied to the check bit extracting circuit 4, while a timing signal S106 is applied to the control bit extracting circuit 7 and the control bit inserting circuit 10.

The operation of the channel monitoring circuit shown in FIG. 1 is as follows.

The demodulated signals from the demodulator 203 are applied to the input terminal 1-1 - 1-N, respectively. The mark counter 3 counts the number of mark signals contained in each data section of the N row signals. The output signal S101 of the counter 3 is supplied to one input of the comparator 5. Under the control of the timing control signal S102 supplied from the timing signal generator 11, the check bit extracting circuit 4 extracts a parity check bit contained in the data signal S100-1 and provides a parity check signal S103.

FIGS. 2A and 2B show the timings of extracting the parity check bit from the input data signal. FIG. 2A shows a train of the series data supplied to the repeater station in which A shows a range of one data check, that is, a section described above which contains a predetermined number of the time slots. The leading time slot B is used to insert a parity check bit at the transmitting terminal station and is designed to be included in the signal S100-1 to the input terminal 1-1. Based on a extracted reference signal, the timing signal generating circuit 204 applies to the check bit extracting circuit 4 a signal S102 (FIG. 2B) representing the timing corresponding to time slot B. The check bit extracting circuit 4 extracts the contents of the time slot B in accordance with the timing signal S102. The extracted content is outputted as a parity check signal S103.

The comparator 5 compares two input signals S101 and S103 to output a comparator output signal S104.

The comparator output signal S104 becomes a coincidense signal when no code error occurs at each section A between the repeater station and the transmitting terminal station, whereas becomes a noncoincidense signal when a code error is produced therebetween. The comparator output signal S104 is sent to the fault detecting circuit 6 and the logic circuit 8. In response to this comparator output signal S104, the fault detecting circuit 6 generates a fault alarm signal S105. More particularly, by the fault alarm signal S105, a fault between the transmitting terminal station and the repeater station is detected. The fault alarm signal S105 is sent to the alarm and display device 11. The foregoing system is the conventional method of detecting a fault between a transmitting terminal station and the stations included in the transmission system using the known parity check technique.

The time slot C shown in FIG. 2A is provided for the purpose of inserting an information signal which informs presence of a code error in the transmission line between the transmitting station and the immediately preceding station. This time slot is designed to be included in the data signal S100-1. In other words, the comparator output signal S104 in the immediately preceding station is contained in the time slot C. The control bit extracting circuit 7 accesses to the time slot C in accordance with a timing signal S106 (FIG. 2C) generated by the timing signal generating circuit 11, the timing signal S106 being generated like the timing signal S102 to the commensurate with the time slot C. Thus the control bit is extracted and sent to the logic circuit 8 as the parity control signal S107. The logic circuit 8 subjects the comparator output signal S104 and the parity control signal S107 from the control bit extracting circuit 7 to the logical operation and provides a signal S108 representing the presence or absence of a code error between the repeater station and the immediately preceding station. More particularly, if the comparator output signal S104 is a noncoincidence signal, it means that a code error has generated at some point of the transmission line. If the output signal S107 of the control bit extracting circuit 7, that is, the comparator output signal S104 inserted into slot C in the immediately preceding station, is a coincidence signal, it means that the code error has occurred between the repeater station and the immediately preceding station. On the contrary, when the output signal S107 is the noncoincidence signal, it means that the code error has occurred before the immediately preceding station. In this manner a signal S108 represents that whether the code error has occurred between the repeater station and the immediately preceding station or before the immediately preceding station and is sent to the fault detecting circuit 9 from the logic circuit 8. The fault detecting circuit 9 supplies a signal S109 representing a fault on a transmission line between the repeater station and the immediately preceding station to the alarm and display device 11 which informs to the operator the occurrence of a fault on the transmission line and the position of the fault.

The comparator output signal S104 is sent to the control bit inserting circuit 10 to act as a control bit signal to be sent to the succeeding station. In response to the timing signal S106, the control bit inserting circuit 10 inserts the control bit signal into the data signal S100-1, thereby inserting the control bit signal in the time slot C. As above described, data signals respectively containing the parity control bit in the time slot C and the parity bit in the time slot B are outputted from the output terminals 2-1 . . . 2-N and sent to the succeeding station by the transmitting unit 300. Each repeater station between the transmitting and receiving stations is provided with the channel monitoring circuit described above which is constructed and operates as above described. The fault alarm signal S109 in each repeater station is used for alarming the fault in one radio section between adjacent repeater stations or a radio section between the repeater station and the transmitting or receiving terminal station. The fault alarm signal S105 can be used as an information for switching the transmission channels between terminal stations.

As described above, the present invention provides the novel channel monitoring circuit of the radio digital transmission system capable of detecting not only the fault between the transmitting and receiving terminal stations, but also the position of the fault.

What is claimed is:

1. A channel monitoring circuit for use in a repeater station of a radio digital transmission system comprising:

an input terminal supplied with a digital input signal from a receiving unit of said repeater station;

a counter connected to said input terimal for counting a number of mark signals contained in a data section having a predetermined number of time slots;

a check bit extracting circuit connected to said input terminal for extracting a parity check pit from said input signal;

a comparator for comparing output signals of said counter and said check bit extraction circuit;

a first fault detecting circuit responsive to an output signal of said comparator for detecting a fault on said transmission system between a transmitting station and said repeater station;

a control bit inserting circuit for inserting into a time slot of said input signal said output of said comparator to act as a parity control bit; an output terminal connected to said control bit inserting circuit for sending said input signal inserted with said parity control bit to a transmitting unit of said repeater station;

a control bit extracting circuit for extracting a content of said time slot for said parity control bit from said input signal;

a logic circuit supplied with an output signal of said control bit extracting circuit and an output signal of said comparator for logically operating these output signals to produce a signal representing occurrence of a fault; and a second fault detecting circuit responsive to an output signal of said logic circuit for detecting a fault on said transmitting system between the repeater station and an immediately preceding station.

2. The channel monitoring circuit according to claim 1 wherein each of said input and output terminals has N parallel terminals which are directly interconnected except one input terminal and one output terminal, said one input terminal being connected to input terminals of said check bit extracting circuit, said control bit extracting circuit and said control bit inserting circuit and said one output terminal being connected to an output terminal of said control bit inserting circuit.

3. The channel monitoring circuit according to claim 1 wherein an output signal of said comparator represents a coincidence or noncoincidence of said two input signals.

4. The channel monitoring circuit according to claim 1 which further comprises an alarm and display device connected to receive output signals of said first and second fault detectors.

* * * * *

UNITED STATES PATENT AND TRADEMARK OFFICE
CERTIFICATE OF CORRECTION

PATENT NO. : 4,653,070

DATED : March 24, 1987

INVENTOR(S) : Nakajima et al

It is certified that error appears in the above-identified patent and that said Letters Patent is hereby corrected as shown below:

Column 4, line 59, (Claim 1), delete "pit" and insert

--bit--.

Signed and Sealed this

Fifteenth Day of March, 1988

*Attest:*

DONALD J. QUIGG

*Attesting Officer*   *Commissioner of Patents and Trademarks*